US005790934A

United States Patent [19]
Say et al.

[11] Patent Number: 5,790,934
[45] Date of Patent: Aug. 4, 1998

[54] APPARATUS FOR PHOTOCATALYTIC FLUID PURIFICATION

[75] Inventors: James Say, Breckenridge, Colo.; Roger Bonnecaze, Austin, Tex.; Adam Heller, Austin, Tex.; Steven Sitkiewitz, Austin, Tex.; Ephraim Heller, Oakland, Calif.; Paul Haugsjaa, Acton, Mass.

[73] Assignee: E. Heller & Company, Alameda, Calif.

[21] Appl. No.: 739,089

[22] Filed: Oct. 25, 1996

[51] Int. Cl.$^6$ ..................................................... B01J 19/12
[52] U.S. Cl. ........................ 422/186; 422/186; 422/186.3; 204/157.13; 204/157.15
[58] Field of Search ................... 422/186, 186.3; 204/157.3, 157.15

[56] References Cited

U.S. PATENT DOCUMENTS

| 4,788,038 | 11/1988 | Matsunaga | 422/22 |
| 4,892,712 | 1/1990 | Robertson et al. | 422/186 |
| 4,954,465 | 9/1990 | Kawashima et al. | 502/5 |

(List continued on next page.)

FOREIGN PATENT DOCUMENTS

| PH7074 | 7/1986 | Australia. |
| 600289 B2 | 8/1990 | Australia. |
| 0 401 884 A2 | 12/1990 | European Pat. Off.. |
| 0 684 075 A1 | 11/1995 | European Pat. Off.. |

(List continued on next page.)

OTHER PUBLICATIONS

Augugliaro, et al., *Chem. Biochem. Eng. Q.* 9 (3) 133–139 (1995) "Performance of a Continuous Flat Reactor for Phenol Degradation in Heterogeneous Photocatalytic System".

Chester, et al., *J. Ohotochem. Photobiol. A: Chem.* 71 291–297 (1993) "A Jacketed Annular Membrane Photocatalytic Reactor for Wastewater Treatment: Degradation ofFormc Acid and Atrazine".

Dibble, et al., *Environ. Sci. Technol.* 26 (3) 492–5 (1992) "Fluidized–Bed Photocatalytic Oxidation of Trichloroethylene in Contaminated Airstreams".

Formenti, et al., *Chem. Technol*, 680–6. (abstract only) (Nov. 1971) "Heterogeneous Photocatalysis For Partial oxidation of Paraffins".

Formenti, et al., *Catal. Proc. Int. Cong.*, 5th Meeting, 2: 1011–23. J. Hightower et al., ed., (1973) "Heterogeneous Photocatalysis. Partial and Total Oxidation of Hydrocarbons and Inorganic Compounds at Room Temperature on Solid Catalyst under Irradiation".

(List continued on next page.)

*Primary Examiner*—Stephen Walsh
*Assistant Examiner*—Elaine Lazar-Wesley
*Attorney, Agent, or Firm*—Merchant, Gould, Smith, Edell, Welter & Schmidt, P.A.

[57] ABSTRACT

A compact, efficient reactor for the photocatalyzed conversion of contaminants in a fluid stream. The reactor includes a photocatalyst disposed on a support structure with a light source in optical proximity to the support structure to activate the photocatalyst. In one embodiment of the invention, the support structure includes multiple non-intersecting fins oriented parallel to the general flow direction of the fluid stream to provide a reactor with low pressure drop and adequate mass transfer of the contaminant to the photocatalyst disposed on the surface of the fins. The light source includes one or more lamps that may penetrate the fins to provide efficient illumination of the photocatalyst. The fins may be flat or pleated. In an alternative embodiment, the fins are pleated and composed of a porous material. These fins are oriented so that the fluid stream flows through the fins. In another embodiment, the support structure includes one or more cylinders having pleated inner surfaces with longitudinal lamps disposed within the cylinders. The photocatalyst is deposited on the inner surface of the cylinder to convert contaminants flowing through the cylinder. The reactor is designed for ease of support structure or light source removal or replacement and may be used as a modular subassembly in a larger fluid purification unit.

20 Claims, 7 Drawing Sheets

U.S. PATENT DOCUMENTS

| | | | |
|---|---|---|---|
| 4,966,759 | 10/1990 | Robertson et al. | 422/186 |
| 5,032,241 | 7/1991 | Robertson et al. | 204/157.15 |
| 5,035,784 | 7/1991 | Anderson et al. | 204/158.14 |
| 5,045,288 | 9/1991 | Raupp et al. | 422/186.3 |
| 5,069,885 | 12/1991 | Ritchie | 422/186 |
| 5,116,582 | 5/1992 | Cooper et al. | 422/186.3 |
| 5,126,111 | 6/1992 | Al-Ekabi et al. | 422/186.3 |
| 5,227,053 | 7/1993 | Brym | 210/143 |
| 5,246,737 | 9/1993 | Muradov | 427/307 |
| 5,259,854 | 11/1993 | Newman | 55/320 |
| 5,292,479 | 3/1994 | Haraga et al. | 422/5 |
| 5,330,722 | 7/1994 | Pick et al. | 422/121 |
| 5,427,503 | 6/1995 | Haraga et al. | 416/223 B |
| 5,449,443 | 9/1995 | Jacoby et al. | 204/157.3 |
| 5,516,492 | 5/1996 | Dong et al. | 422/186 |
| 5,616,532 | 4/1997 | Heller et al. | 502/242 |

FOREIGN PATENT DOCUMENTS

| | | |
|---|---|---|
| 63 100042 | 5/1988 | Japan . |
| 63 302856 | 12/1988 | Japan . |
| 63 315138 | 12/1988 | Japan . |
| 1139139 | 5/1989 | Japan . |
| 1159030 A2 | 6/1989 | Japan . |
| 1159032 | 6/1989 | Japan . |
| 1159033 | 6/1989 | Japan . |
| 1189322 A2 | 7/1989 | Japan . |
| 1218635 | 8/1989 | Japan . |
| 2207823 A2 | 8/1990 | Japan . |
| 394814 | 4/1991 | Japan . |
| 3106420 | 5/1991 | Japan . |
| 3140707 | 6/1991 | Japan . |
| 4-61933 (A) | 2/1992 | Japan . |
| 4327851 A2 | 11/1992 | Japan . |
| 07251028 A | 10/1995 | Japan . |
| 07289913 A | 11/1995 | Japan . |
| 07328351A | 12/1995 | Japan . |
| 08010576 A | 1/1996 | Japan . |
| 91/09823 | 7/1991 | WIPO . |

OTHER PUBLICATIONS

Hofstadler et al., *Environ. Sci. Technol.* 28 670–674 (1994) "New Reactor Design for Photocatalytic Wastewater Treatment with $TiO_2$ Immobilized on Fused–Silica Glass Fibers: Photomineralization of 4–Chlorophenol".

Kraeutler, et al., *J. Am. Chem. Soc.* 100(13) 4317–8 (1978) "Hetergeneous Photocatalytic Preparation of Supported Catalysts Photodedesition of Platinum on $TiO_2$ Powder and Other Substrates".

Light Stream Photocatalytic, LLC; Press Release (Aug., 1995) "NIST Awards $2 Million Contract to EHC/Lightstream For Development of New Photocatalyst Technology".

Matthews, *Chem. In. (London)*, (1) 28–30 (abstract only); (1988) "Adsorption Photocatalytic Oxidation: A Method of Water Purification".

Matthews, *Solar Energy*, 38 (6) 405–413 (1987) "Solar–Electric Water Purification Using Photocatalytic Oxidation with $TiO_2$ As a Stationary Phase".

Schwartzel, *UV Wavelength*, p. 6 (Spring, 1994) "Uv Lamp Output and the System Design Process", Trojan Technologies, Inc.

Ohtani, et al., *Polym. Degrad. Stab.* 23 (3) 271–8 (abstract only); (1989) "Photocatalytic Degradation of Polypropylene Film by Dispersed Titanium Dioxide Particles".

Ohtani, et al., *Poly. Degrad. Stab.* 35 (1) 53–60 (abstract only); (Volume Date 1992) (pub. year 1991) "Photocatalytic Degredation of Polyethylene Film by Incorporated Extra–Fine Particles of Titanium Dioxide".

Peral, et al., *J. Catal.* 136 554–565 (1992) "Heterogeneous Photocatalytic Oxidation of Gas–Phase Organics for Air Purification: Acetone, 1–Butanol, Butyraldehyde, Formaldehyde, and m–Xylene Oxidation".

Sauer et al., *J. Catal.* 149 81–91 (1994) "Acetone Oxidation in a Photocatalytic Monolith Reactor".

Sczechowski et al., *Chem. Eng. Sci.* 50 (20) 3163–3173 (1995) "A Taylor Vortex Reactor for Heterogeneous Photocatalysis".

Suzuki, *Photocatalytic Purification and Treatment of Water and Air*, D.F. Ollis and H. Al–Ekabi, editor; Elsevier Science Publishers B.V., 421–434 (1993) "Photocatalytic Air Purification on $TiO_2$ Coated Honeycomb Support".

Wyness et al., *J. Solar Energy Engineering—Transactions of the ASME* 116 8–13 (Feb. 1994) "Performance of Nonconcentrating solar Photocatalytic Oxidation Reactors, Part II: Shallow Pond Configuration".

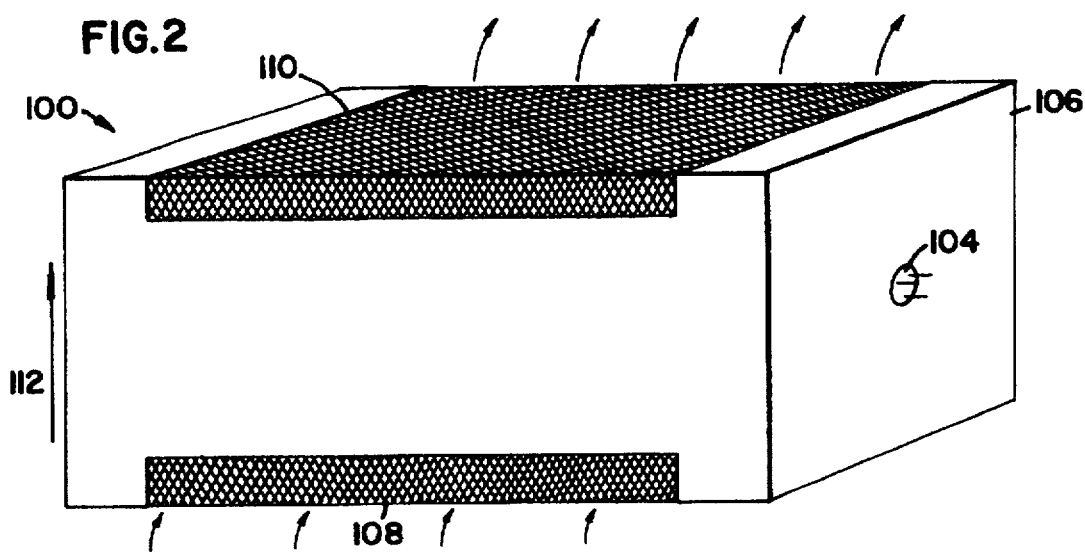
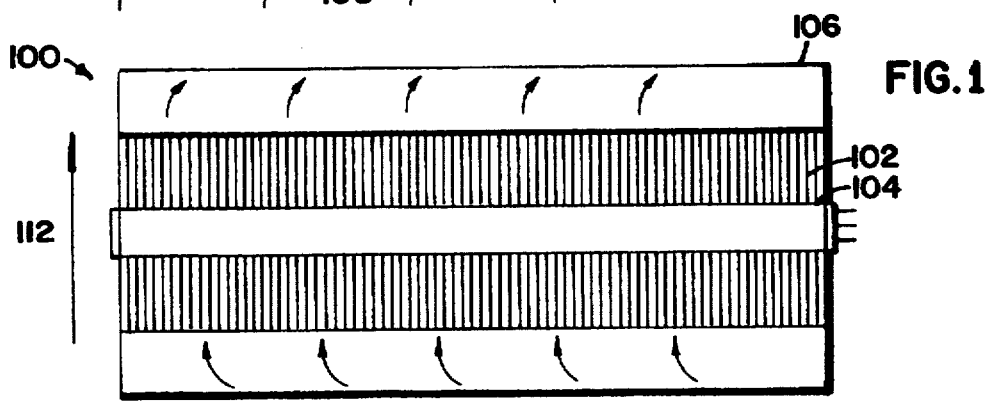
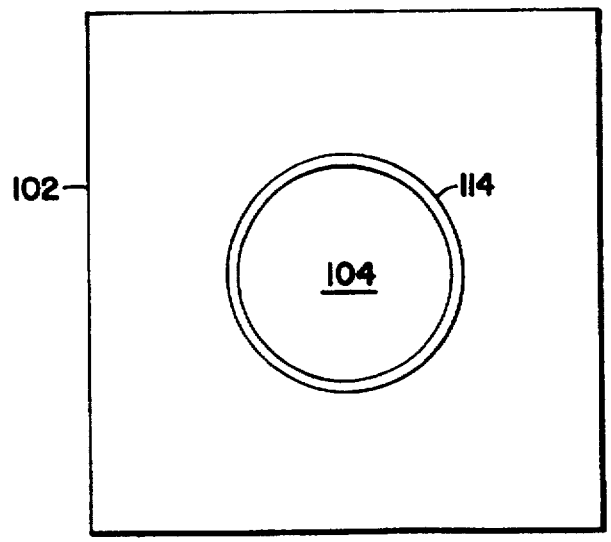

5,790,934

1

APPARATUS FOR PHOTOCATALYTIC FLUID PURIFICATION

BACKGROUND OF THE INVENTION

Fluid streams, such as water or air, often include contaminants like dissolved halogenated or organic compounds, volatile organic compounds, nitrogen oxides, inorganic gases like hydrogen cyanide, and microorganisms such as bacteria, viruses, molds, and fungi. Photocatalysts can be used to purify the fluid stream by converting these contaminants into less harmful substances or materials which may be more easily removed from the fluid stream.

The conversion of contaminants occurs when the fluid stream is brought in contact with a photocatalyst illuminated by a nearby light source. The photocatalyst is typically deposited on the surface of a support structure of some type to provide a stable photocatalytic surface and to ensure that the photocatalyst is not carried away by the fluid stream. Reactors employing these basic concepts have been developed. Other design factors, however, greatly influence reactor configuration.

To be effective, the contaminants must be brought into contact with the photocatalyst. The effectiveness of this process is measured by the mass transfer coefficient of the reactor which is the rate at which the contaminant is transported from the fluid stream to the photocatalytic surface. If the mass transfer system of the reactor is inadequate then conversion of contaminants will be diminished. Thus, an effective reactor design should provide for adequate mass transfer from the bulk fluid to the photocatalyst.

Another design consideration is the pressure drop in the reactor. Pressure drop occurs when objects interrupt the fluid flow thereby creating a pressure differential between the fluid on opposite sides of the hindering objects. To minimize pressure drop, fluid flow should be interrupted as little as possible to maintain a laminar flow. Significant pressure drop in the reactor will increase the operating costs of the system dramatically.

There is, however, a fundamental tension between design characteristics that increase mass transfer to the catalyst and those that decrease pressure drop. An increase in mass transfer typically requires increased contact with the support structure, whereas a decrease in pressure drop typically requires less interference by the support structure. Typical reactor designs place the support structures perpendicular to the fluid stream to ensure that the stream impacts the surface containing the photocatalyst to provide good mass transport. This reactor configuration, however, has a decidedly negative impact on pressure drop. Thus, there is a need for a reactor design which will provide adequate mass transfer to eliminate the contaminants in the fluid but at the same time provide a low pressure drop so that the fluid stream will flow smoothly through the reactor.

In addition, the photocatalyst must have sufficient contact time with the contaminant to catalyze the conversion reaction. The required contact time is determined by the kinetics of the catalyzed conversion reaction, taking into account competing reactions of other components in the fluid stream. The kinetics of a photocatalyzed reaction depend, in part, on the intensity of the light irradiating the photocatalyst. When the light intensity is too low the photocatalyst is not fully utilized and can not convert all of the contaminants that come in contact with it. Thus, an effective reactor design should provide for adequate illumination over the entire photocatalytically active surface.

2

Another desirable feature is the efficient use of illumination from the light sources within the reactor. Efficient illumination of a material or support with a large surface area per unit volume would provide the basis for a highly desirable compact reactor. In addition, a suitable reactor should be easy to maintain, manufacture, and service. The replacement of light sources and support structures should be easily accomplished with a minimum of difficulty.

These aspects of reactor design have not been sufficiently addressed in current designs. There is a need for a reactor with one and preferably more of the following characteristics: compactness, low pressure drop coupled with adequate mass transfer to the photocatalyst, efficient use of light to illuminate photocatalyst dispersed on a high surface area support, simple maintenance of lamps and photocatalyst support structures, and low cost manufacturing, maintenance and repair.

SUMMARY OF THE INVENTION

The present invention is directed to a reactor for use in the photocatalyzed conversion of compounds that satisfies these needs. One embodiment of the invention is a reactor that includes a light source, a photocatalyst, and a plurality of non-intersecting fins to support the photocatalyst. The fins are oriented substantially parallel to the flow direction of the fluid stream and positioned so that they are substantially orthogonal to the light source. The fins are configured so that the light source illuminates the photocatalyst on the fins.

In an alternative embodiment of the invention, the fins include one or more pleats that are aligned substantially perpendicular to the light source. The pleats are configured so that light from the light source will illuminate the photocatalyst on the fins.

In another embodiment of the invention, the reactor includes a formed block having one or more hollow cylinders coated with photocatalyst and oriented substantially parallel to the flow direction of the fluid stream. The inner surface of each cylinder includes one or more pleats upon which the photocatalyst is disposed. One or more cylindrical light sources is positioned within each cylinder so that a longitudinal axis of the light source is parallel to the longitudinal axis of the cylinder. The pleats and the light source are configured so that light from the light source illuminates substantially all of the inner surface of each cylinder. Optionally, the block is formed of a porous material, permitting fluid flow throughout the block.

A further embodiment of the invention includes a plurality of fins stacked one on top of the other with a spacing between them to form a column. Each fin is ring-shaped with a central opening. Alignment of the fins forms a central cavity in the columnar structure, aligned substantially parallel to the input fluid stream flow. A rotation device may be attached to the column of fins to rotate the column. As the fins rotate, the fluid flow is drawn into the central cavity and is dispersed radially, substantially parallel to the surface of the fins. Photocatalyst is disposed on the fins and a light source is positioned within optical proximity of the fins, e.g. within the central cavity or adjacent the periphery of the ring-shaped fins, to illuminate the photocatalyst.

BRIEF DESCRIPTION OF THE DRAWINGS

Referring to the Drawing, wherein like reference numerals represent like parts throughout the several views:

FIG. 1 is a schematic view of the interior of a reactor 100 constructed in accordance with an embodiment of the invention having fins 102 upon which photocatalyst has been deposited, the fins being parallel to the flow of the fluid stream;

FIG. 2 is a perspective view of the exterior of reactor 100 showing the inlet and outlet ports of the reactor;

FIG. 3 is a front view of a fin 102 for use with the reactor of FIG. 1;

DETAILED DESCRIPTION OF THE PREFERRED EMBODIMENT

Figure 4:
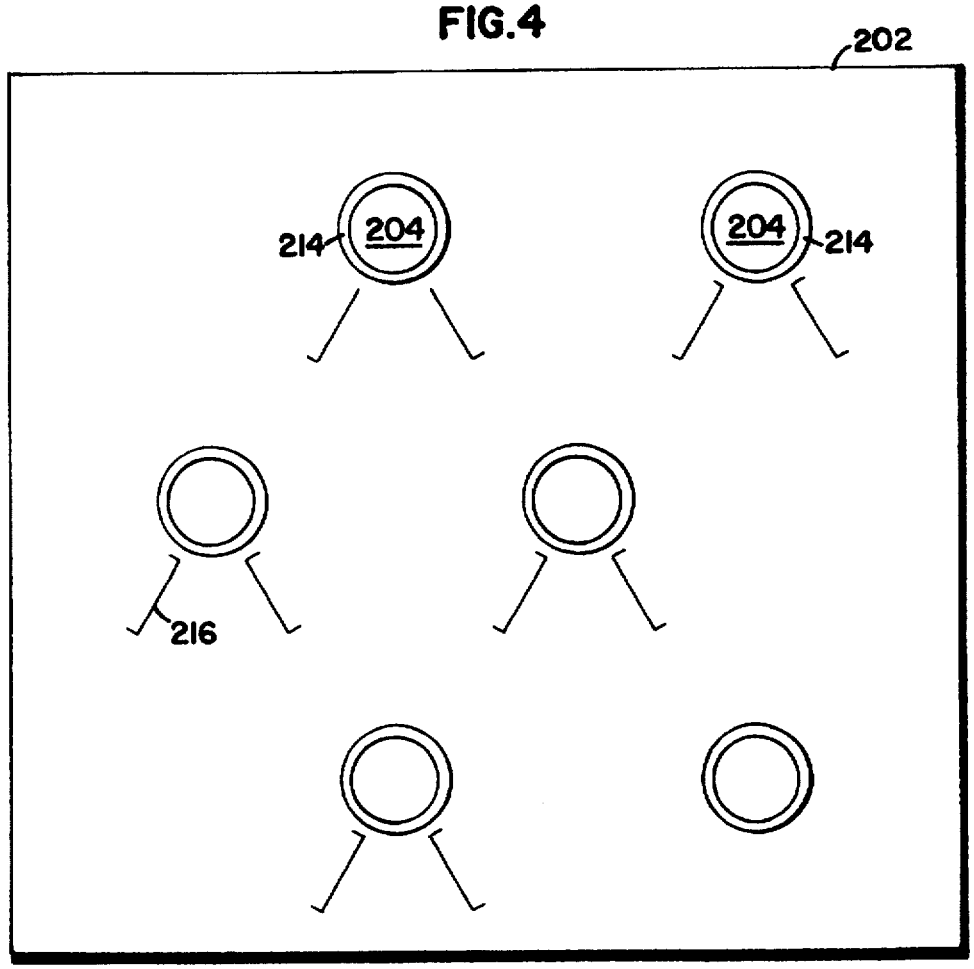
FIG. 4 is a front view of a fin 202 for use with a version of the reactor of FIG. 1 which includes multiple light sources 204.

The present invention relates to a reactor and a method of operating the reactor to conduct photocatalytic conversion of contaminants in a fluid stream. A reactor constructed according to the principles of the invention contains one or more support structures upon which a photocatalyst has been deposited. The photocatalyst is activated by one or more light sources which illuminate the support structures. A fluid stream flows between the support structures and fluid containing contaminants is brought into contact with the photocatalyst to convert the contaminants, in the presence of the photocatalyst, to other less harmful or more easily extracted compounds. Referring to the Drawing, one embodiment of the invention is illustrated in FIGS. 1–5. A reactor 100 is comprised of a plurality of substantially parallel fins 102 arranged orthogonally to a light source 104 and housed within a reactor chamber 106. Reactor chamber 106 includes one or more inlet ports 108 and one or more outlet ports 110 in the chamber walls through which the fluid stream enters and exits. The disposition of ports 108, 110 provides a general fluid flow in direction 112. Fins 102 are disposed substantially parallel to fluid flow direction 112 within chamber 106.

Fins 102 comprise the support structure upon which the photocatalyst is deposited. FIG. 3 displays one embodiment of fin 102. Fin 102 is preferably a thin, flat sheet constructed from a material which provides adequate support for the photocatalyst. Suitable materials include metal, plastic, polymers, paper, cloth, or fiber. The photocatalyst is disposed on the front, back, or both surfaces of fin 102. These surfaces may be roughened by methods such as sandblasting or etching to increase the surface area of the fin. In a preferred embodiment, the support structure (fins or block, as described below) includes a reflective surface, e.g. a material that scatters or reflects activating wavelengths of light. For example, the fins may include a surface of reflective aluminum or magnesium, which scatters/reflects 254 nm light. Alternatively, fin 102 may be made of a porous material such as paper, cloth, or fiber so that fluid may flow through fin 102 thereby increasing exposure of the fluid to the photocatalyst. Fin 102 may be a square, as depicted in FIG. 3, or other shapes including rectangles, circles, and other polygons. The shape of fin 102 will often be dictated by the desired reactor or light source configuration. In one embodiment of fin 102, as shown in FIG. 3, fin 102 includes an opening 114 through which light source 104 penetrates. Alternatively, light source 104 is disposed within optical proximity of fin 102 and adjacent to one or more edges of fin 102.

The activity of the photocatalyst depends on the intensity of light reaching it. If that intensity is too low, the photocatalyst will not be active or will have reduced activity. The required activity for the photocatalyst is generally dependent upon the amount and concentration of contaminants in the fluid flow. Light source 104, comprising one or more lamps, illuminates fin 102 providing light on the surface of fin 102 to activate the photocatalyst deposited thereon. Light source 104 can be modeled as a surface having many points, each point radiating light with an intensity $I_s$. The intensity of the light from each individual point on light source 104 that illuminates a particular point on fin 102 will depend on the distance between the two points. The further the distance, the less intense the light will be. The total intensity of light illuminating a particular point on fin 102 is simply a sum of the intensity of light from each point on light source 104 which is not blocked by some obstruction.

An efficient photocatalytic reactor is designed so that substantially all of the photocatalyst is sufficiently close to a light source to achieve the required activity. A further factor in an efficient design is efficient use of the light. Light source 104 is preferably configured within reactor 100 so that as much light from light source 104 as possible will illuminate the photocatalyst. Fin 102 of FIG. 3 is designed to maximize the use of the available light by having light source 104 penetrate the opening 114 in the center of fin 102.

An alternative fin embodiment is presented in FIG. 4. In this case, fin 202 has multiple openings 214 through which multiple light sources 204 can penetrate. The use of multiple light sources is advantageous because the light from the different light sources can combine to activate regions of fin 202 that would otherwise not be adequately reached and activated with single light source. Fin 202 of FIG. 4 and multiple light sources 204 can be utilized in a reactor 100 to ensure that there is sufficient illumination of the photocatalyst over a larger fin area.

In addition, the use of multiple light sources permits fins 202 to be spaced closer together. The light impacting each fin 202 comes essentially from the portion of each light source which is between a fin and its next nearest neighbor. As the spacing between fins becomes smaller there is less light illuminating each fin because a smaller portion of the light source is visible. Because multiple light source arrangements provide much more light over the same fin surface area, the spacing between fins can be narrower and yet still provide adequate light intensity to provide the necessary activity of the photocatalyst.

The amount of spacing between the fins is important to the reactor configuration. Referring to FIGS. 1 and 2, fins 102 are positioned parallel to the general direction of fluid flow 112. This configuration has the advantage that the pressure drop through reactor 100 is substantially lower than a configuration with fins perpendicular to the fluid flow. However, the transport of contaminants to the surface of fins 102 which support the photocatalyst is affected by this arrangement. The space between fins 102 should be narrow to ensure that the contaminants are brought in contact with the photocatalyst. In one embodiment of the invention a reactor includes at least 20 fins and preferably more than 100 fins. When the fluid is a gas, the distance between the fins is preferably between 0.05–5 cm and most preferably between 0.25–0.75 cm.

This distance permits efficient transport of the compound to be converted to the photocatalyst and provides for low pressure drop across the reactor. In addition, the thickness of the fins is preferably less than 0.2 cm and most preferably less than 0.05 cm to minimize the amount of light absorbed by the edges of the fins and provide for a lightweight, compact reactor. The surface area to volume ratio for the zone containing the fins or catalyst supports, termed the "fixed bed portion of the system" is preferably greater than 0.5 cm$^{-1}$, and most preferably greater than 4 cm$^{-1}$ so that even slowly reacting compounds will be converted.

To minimize pressure drop the reactor is preferably designed so that the flow is substantially laminar corresponding to a Reynolds number less than approximately 2,000. Alternatively, to maximize mass transport to the photocatalyst, reactor 100 may be designed to provide turbulent flow corresponding to a Reynolds number greater than approximately 2,000. Turbulent flow can be produced by inclusion of one or more turbulent flow generators 216 (see FIG. 4) on the fins. Turbulent flow generators 216 can be strips of metal or other material positioned at least partially perpendicular to the general direction of the fluid flow. Generators 216 may either guide the fluid in other directions or may produce cross-stream vortices which are swirling flows predominantly perpendicular to the direction of the main flow. One use of turbulent flow generators 216 is to direct flow to regions of fin 202 which might otherwise not have adequate fluid flow, for example, regions of the fin adjacent to a light source, where the light source 204, being perpendicular to fluid flow direction 112, creates regions in the lee of the light source with insufficient fluid flow. Use of turbulent flow generators can provide a more even distribution of fluid flow over the fin surface to maximize the transport of contaminants to the photocatalyst for conversion. In a preferred configuration, turbulent flow generators are used in a substantially laminar fluid flow to enhance mass transport specifically to those portions of the fin's surface that receive poor mass transport due to obstructed fluid flow, for example, behind a lamp.

Suitable photocatalysts for use in the reactors of this invention include semiconductors such as $TiO_2$, $ZnO$, $CaTiO_3$, $SnO_2$, $MoO_3$, $Fe_2O_3$, $WO_3$, $Nb_2O_5$, $SiC$ and $Ti_x(Zr_{1-x})O_2$ where x has a value between 0 and 1. The support structures for the photocatalyst (e.g. fins 102, 202) may themselves be photocatalytic or become photocatalytic upon treatment. For example, oxidation of the surface layer of support structures made of zinc or tin result in zinc or tin oxide, both of which are photocatalytic. Cocatalysts may be used in conjunction with the photocatalyst to enhance the conversion rate. Suitable cocatalysts include Pt, Pd, Ru, Ag, Cu, W, Rh, Mo, Au, Fe, and the oxides and sulfides of these metals. Other known photocatalysts and cocatalysts may be used in the reactors of this invention.

Each photocatalyst is characterized by a range of wavelengths of light which activate the photocatalyst. The invention is not restricted to use with UV light. Both longer and shorter wavelengths may be used with appropriate choice of photocatalyst. For example, the photocatalyst may be overcoated with a thin film of photooxidation-resistant dye to expand the range of activating wavelengths into the visible range. Appropriate photooxidation-resistant dyes include metal ion complexes of phthalocyanines, bipyridines, and phenanthrolines.

The photocatalyst may be deposited on the support structure by many different techniques. Suitable photocatalyst deposition techniques include dip coating, spraying, or brushing, however, those skilled in the art will recognize that other deposition techniques are included within the scope of the invention.

In a preferred embodiment of the invention, the photocatalyst is securely bound to a support structure during operation of reactor so that the photocatalyst is not released into the environment. Suitable photocatalyst binding techniques include adsorption, sintering, lamination, the use of substantially nonoxidizable binders, and combinations thereof. The use of nonoxidizable binders is described in Heller et al., U.S. patent application Ser. No. 08/327,016, now U.S. Pat. No. 5,616,532 incorporated herein by reference.

A variety of light sources may be utilized to illuminate the photocatalyst in the reactor. These include ultraviolet (UV) and visible lamps. The light source should provide an average activating light intensity at the photocatalyst preferably between 0.1–10 mW/cm$^2$ and most preferably between 0.5–2.0 mW/cm$^2$. This light intensity provides adequate photocatalytic activity to convert most contaminants, including formaldehyde. Higher light intensity would increase the operating costs of the system while increasing efficiency only marginally. It is also desirable that the light source utilized in the reactors of the invention maintain a steady output of catalyst-activating light during the service life of the system. Degradation of less than 20% per year is preferred.

Suitable light sources include low-pressure mercury discharge lamps which provide UV light and comprise mercury, neon, argon, krypton, or xenon gases or a mixture thereof within a lamp envelope. The envelope can be formed of ceramic or glass and may be phosphor-coated. The envelope may also be formed of fused quartz or 95% silicon dioxide. Mercury discharge lamps have a temperature-sensitive output and therefore care must be taken to ensure that the temperature of the lamp is kept within an acceptable operating range. For example, a "Slimline" mercury-argon lamp has an optimum range of 50° C.±10° C. It is preferred that the lamp temperature be less than 70° C. when the fluid passing through the reactor is indoor air having a temperature in the approximate range of 18° C. to 28° C. Most preferably the lamp temperature (outer wall) is less than 50° C. under these conditions, where the reactor is to be integrated with or used near an air conditioned or furnace that will cause a significant change in the temperature of the fluid stream, it is preferred that the outer walls of the lamp be in the approximate range of 40° C. to 80° C.

Another suitable light source is a type of germicidal lamp employing reduced solarization glass envelope technology. One such lamp is produced commercially by Philips and is Model TUV 30 W G30T8 UV-C long-life. These lamps are low in cost, have low UV degradation, and do not produce significant amounts of ozone. They are made with coated, low melting point, "soft" glass. "Soft" glass tends to solarize, or darken, over time, therefore, it is preferred that the lamp utilize reduced solarization technology to overcome this problem. Other light sources not mentioned are known in the field and will be recognized as being within the scope of the invention.

The lamps may have a tubular geometry, and may be straight tubes or tubes bent into a desired configuration to fit a specific reactor design, e.g., U-shaped or circular. Bending the lamps allows for more efficient distribution of photons and permits reduced number of lamps. A reduced number of lamps is desirable to reduce costs of ballasts, connectors, and lamps required to achieve a desired irradiance level.

Figure 5:
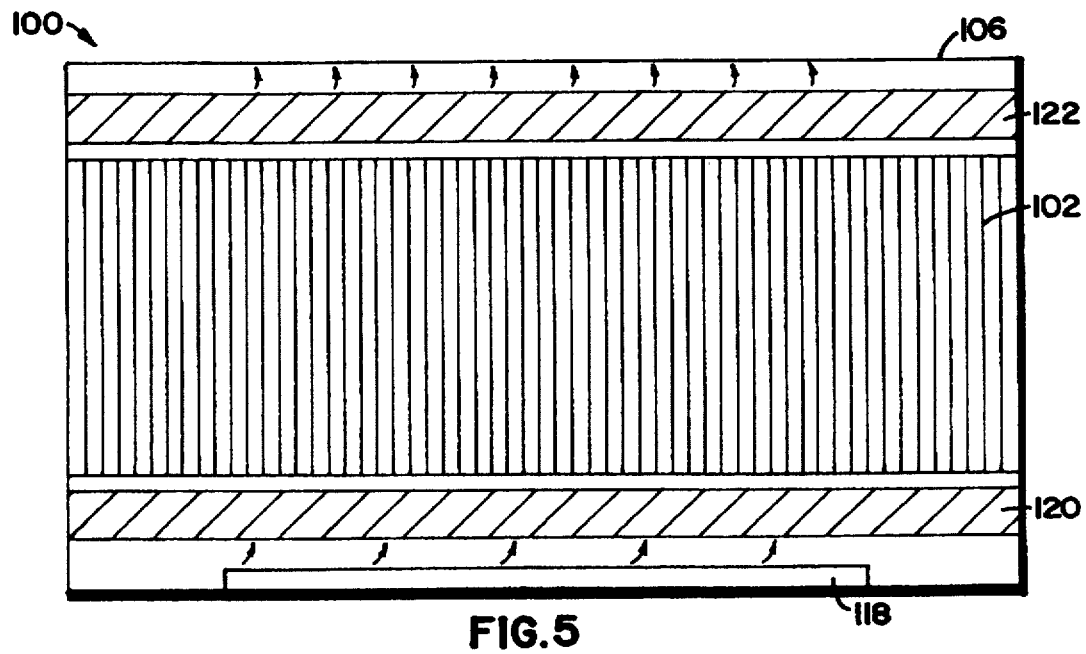
FIG. 5 is a schematic view of a reactor similar to that illustrated in FIG. 1, but also including a blower 118, a pre-filter 120, and a post-filter 122.

Additional structures may be added to reactor 100 to increase its efficiency and capacity. FIG. 5 illustrates the addition of some of these features. A blower 118 can be added to facilitate fluid flow, particularly gaseous fluid, such as air, in direction 112. Blower 118 may comprise a fan or other device which will direct fluid flow. Alternatively, the fluid flow may be caused by an outside device, not shown, such as a fan in a heating, ventilating, or air conditioning system. In addition, a pre-filter 120 may be positioned within reactor 100 so that the fluid flows through pre-filter 120 before entering the region containing fins 102. Pre-filter 120 may be a particle filter or an arrestance device designed to remove particles within the fluid stream to prevent fouling and deactivation of the photocatalyst.

Reactor 100 may also include a post-filter 122 positioned in the fluid stream after fins 102. The post-filter may be designed to capture photocatalyst particles dislodged from fins 102. In addition, post-filter 122 may comprise a scrubber, adsorbent bed, or reactant bed to capture the conversion products of the photocatalyzed reactions.

Another additional structure for reactor 100 is an adsorbent buffer, not shown, positioned in the fluid stream before fins 102 to reduce the magnitude of transients in contaminant concentration, that is, buffer the flux of contaminants through the reactor to reduce the magnitude of peak transients and extend the period of oxidation. The buffer retains contaminant molecules during peak concentration periods, releasing the accumulated compounds over time and during low concentration periods. Because the percentage of incoming contaminant molecules converted by the photocatalyst generally decreases with an increase in concentration, the use of the buffer increases the efficiency of the reactor by decreasing the concentration of compounds during peak periods. Examples of suitable adsorbent buffers include zeolites such as molecular sieve 13X, active carbon, and other high surface area materials such as HEPA filters, wool, or high surface area titanium dioxide. The adsorbent buffer is intended to store the unwanted compounds for only a short period of time, and will not act efficiently once its capacity has been reached. When capacity has been reached the buffer must either be replaced or regenerated. It is preferred that the buffer regenerate itself by desorbing the stored compounds over a period of time, the period of time being a matter of minutes, hours, or days.

An ozone generator, not shown, may also be utilized in conjunction with reactor 100 to partially pre-oxidize organic species, thereby accelerating their subsequent photocatalytic conversion. The ozone generator is preferably positioned to produce ozone in the fluid stream to facilitate the photocatalytic conversion of contaminants. The generated ozone is preferably degraded prior to exit from the reactor. An example of an appropriate ozone generator is an ozone producing UV lamp, which may also serve as a photocatalyst-activating lamp.

Sensors, not shown, may also be provided with reactor 100 attached to indicators to warn a user when some or all of the light sources become non-operational. The sensor may, for example, be comprised of a photodiode or a device for measuring the current of the current through the light source. The sensor may trigger an audio or visual alarm or alarm signal if the illumination provided by the light source fails to meet a specified threshold, or generate an automatic service notification, e.g. via wire, modem, or telemetry system. The reactor may also be desired to automatically shut off if there is an excessive loss of irradiance. A further safety feature includes, for example, interlocks to automatically shut off the light source upon opening of the reactor.

Reactor 100 or a portion of reactor 100 including fins 102 and/or lamps 104 may be formed as a modular subassembly and adapted to connect to other subassemblies to form a larger reactor, not shown. The use of such subassemblies would simplify construction of reactors as well as provide for easier maintenance. The subassemblies may be interconnected either in series or in parallel. When the subassembly requires replacement, a new subassembly can be inserted in its place. Alternatively, a subassembly may be reactivated by washing fins 102 with water or solvents, or by heating the module to regenerate the photocatalytic surface. The reactivated subassembly may then be returned to the reactor.

Figure 6:
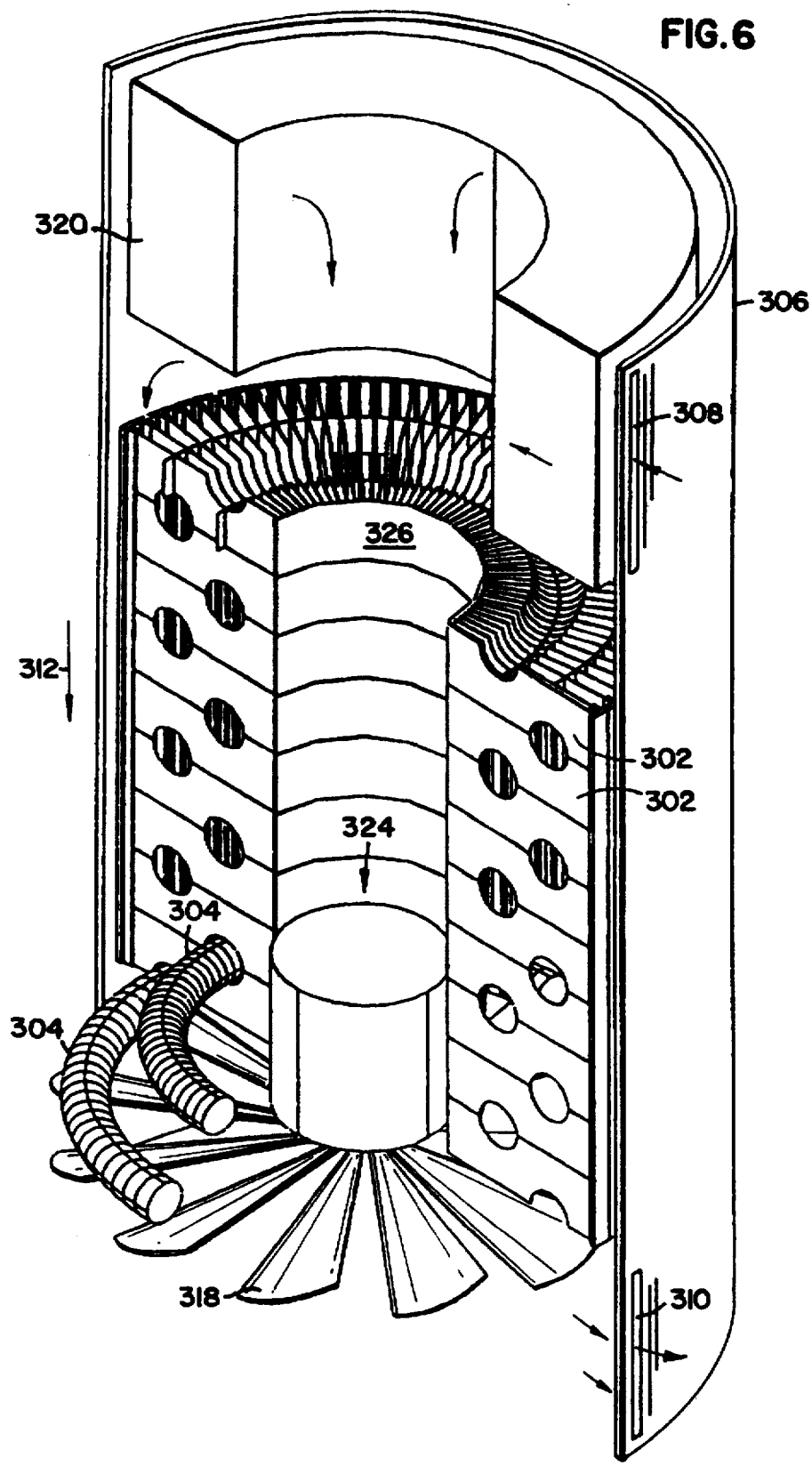
FIG. 6 is a perspective view of a reactor 300 according to the invention, a portion of the reactor side wall being broken away to reveal a partial sectional view of the reactor.
Figure 7:
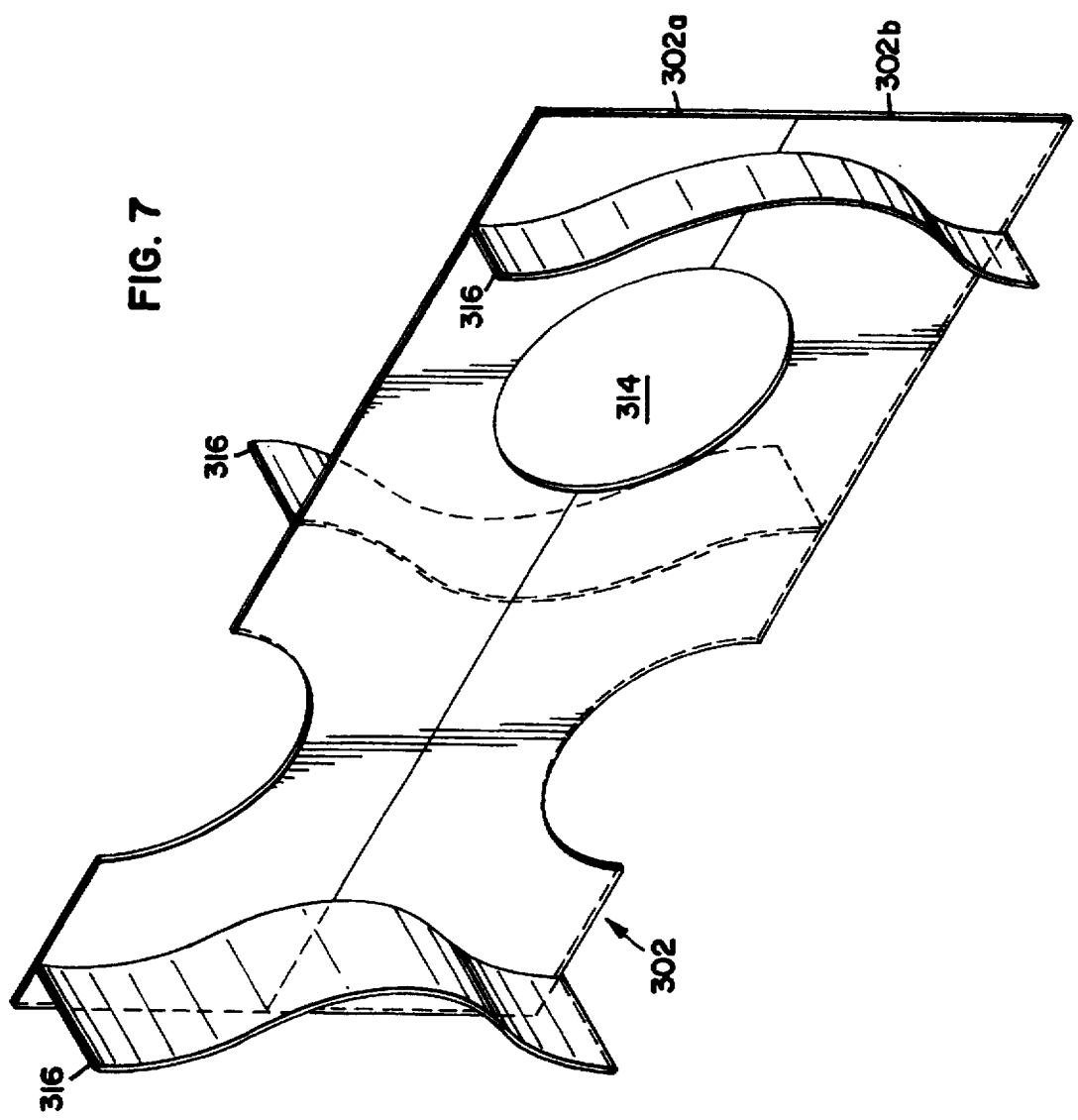
FIG. 7 is a front view of a fin 302 for use in reactor 300 of FIG. 6.

FIGS. 6 and 7 illustrate another embodiment of the invention. In this embodiment, fins 302 are non-intersecting plates arranged radially around a central core 324 and parallel to the longitudinal axis of core 324. Light source 304 includes one or more annular tubes concentrically disposed around core 324 and orthogonal to fins 302 so as to illuminate the surface of fins 302. Fins 302 provide the support structure upon which the photocatalyst is deposited. The fluid stream flows in general direction 312 parallel to fins 302.

Fins 302 may be constructed in subassemblies comprising a central ring 326 with fins 302 attached to the ring and radiating outward at regularly spaced intervals. This configuration permits easy removal of the subassembly for fin or light source replacement. FIG. 7 provides an example of a fin 302 for use in this embodiment of the invention. Fins 302 have openings 314 through which light sources 304 penetrate similar to the arrangement provided for fins 102. Fins 302 may be comprised of two parts 302a, 302b which may be separated to allow for easy removal of light source 304. Fin 302 is substantially similar to fin 102 and those skilled in the art will recognize that the same design considerations and materials apply. In addition, turbulent flow generators 316 similar to generators 116 can be used to direct fluid flow and create cross-stream vortices.

Figure 12:
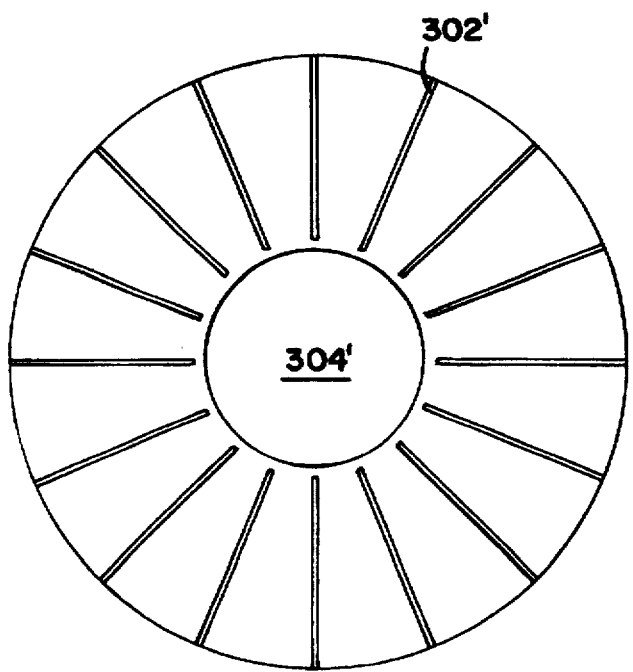
FIG. 12 is a top view of a reactor 300 wherein the light source 304 is positioned in the central core 326.

An alternative embodiment of reactor 300, illustrated in FIG. 12, includes a longitudinal light source 304' within central core 324 rather than annular tubes 304. The fins 302' of this arrangement may or may not include openings for placement of the light sources. Alternatively, the central ring 326 is removed or replaced by a transparent object so that light from a light source 304' disposed in central core 324 illuminates fins 302'.

It will be generally recognized that design considerations for reactor 300 including the choice of light source and photocatalyst, and the inclusion of a blower 318, pre-filter 320, post-filter, adsorbent buffer, ozone generator, and sensor as well as the configuration of the embodiment into a modular subassembly are substantially the same as for reactor 100.

Figure 8:
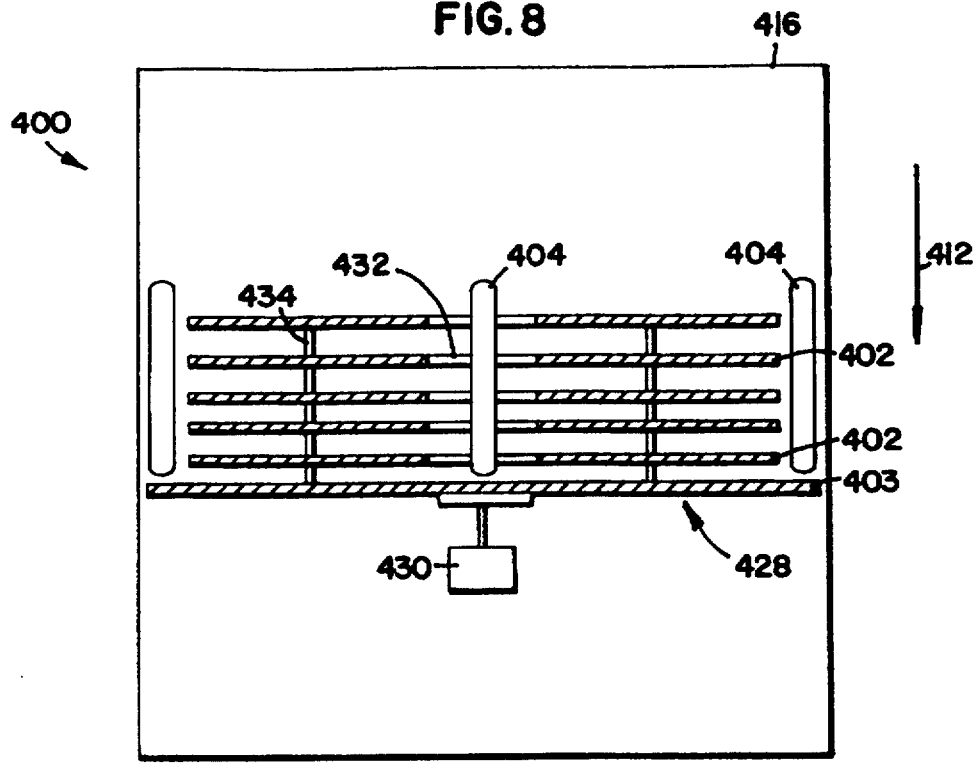
FIG. 8 is a schematic view of a reactor 400 according to the invention which includes a rotating fin assembly for support of the photocatalyst.

FIG. 8 illustrates another embodiment of the invention. Reactor 400 includes a fan 428 comprising a plurality of fins 402 attached to a rotation device 430 designed to rotate fins 402. Fins 402 are ring-shaped having an inner diameter defining a central cavity 432. Optionally, fin 403 nearest rotation device 430 is preferably disc-shaped with no central cavity. Fins 402, 403 are held together by pins 434 so that the fins can be simultaneously rotated by rotation device 430. A light source 404 is provided within central cavity 432 or adjacent to the periphery of fins 402, 403 or in a combination thereof.

Fluid enters the reactor 400 in a general direction 412. Accordingly, the fluid flows through central cavity 432 and is radially displaced through rotation of the fins 402, 403. Fins 402, 403 exert a centrifugal force on the fluid due to shear forces caused by the rotation of fins 402, 403 thereby causing the air to flow parallel to fins 402, 403 and away from central cavity 432. The pins may also be designed to force air radially as the fins rotate, thereby increasing the fluid throughput. The fluid is brought into contact with the photocatalyst deposited on fins 402, 403 as it flows between fins 402, 403. Turbulent flow generators, not shown, similar to generators 116 can be attached to fins 402, 403 and used to increase the flow of fluid to the fin surface.

It will be generally recognized that the materials and design considerations of fins 402, 403 are similar to those for fins 102. In addition, it will be generally recognized that design considerations for reactor 400 including the choice of light source and photocatalyst, and the provision of a blower, pre-filter, post-filter, adsorbent buffer, ozone generator, and sensor as well as the configuration of the embodiment into a modular subassembly are substantially the same as described above for reactor 100.

Figure 9:
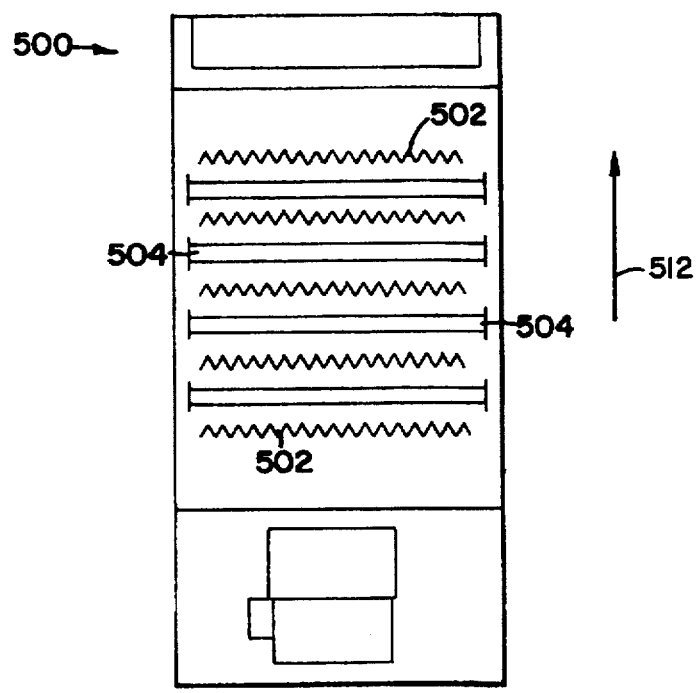
FIG. 9 is a schematic view of a reactor 500 according to the invention which uses pleated fins 502 for support of the photocatalyst.
Figure 10:
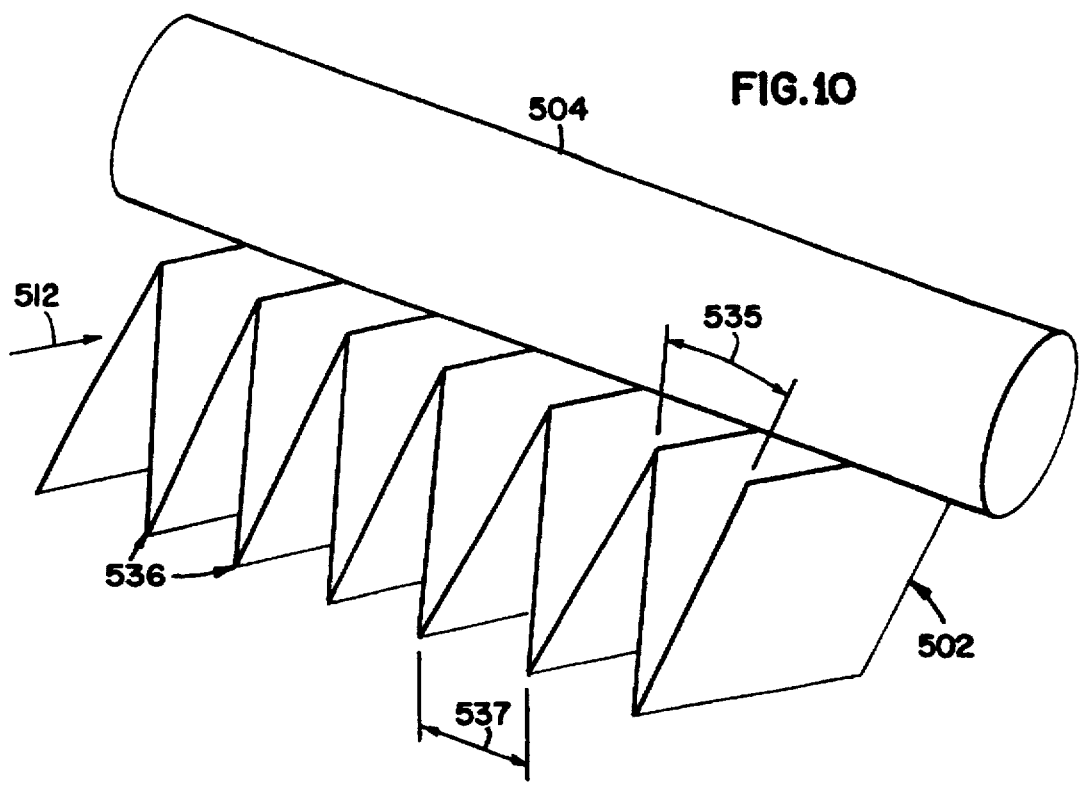
FIG. 10 is a perspective view of the placement of pleated fins 502 of FIG. 9 with respect to a light source 504.

Another embodiment of the invention is illustrated in FIGS. 9 and 10. In this embodiment fins 502 are pleated (see FIG. 10) with pleats 536 running substantially perpendicular to light source 504. Fins 502 and light source 504 are configured to minimize shadowing on the surface of fins 502 which are coated with photocatalyst. Such a configuration works best with substantially flat, uniform pleat surfaces, otherwise there will likely be significant shadowing or variation in irradiance over substantial areas of the pleats, rendering portions of fins 502 photocatalytically inactive or attenuated.

In one embodiment of the invention fins 502 have at least 20 and preferably more than 100 pleats. The angles 535 between the pleats are preferably approximately equal and less than 20°, and more preferably less than 5°. The openings 537 of the pleats are preferably less than 0.75 cm, and most preferably less than 0.25 cm. Pleats 536 are preferably at least 2 cm deep and most preferably greater than 8 cm deep. The surface area to volume ratio of the photocatalytic portion of the reactor is preferably greater than 0.25 cm$^{-1}$ and most preferably greater than 4 cm$^{-1}$.

The fins 502 are constructed from materials such as metal, plastic, polymers, paper, cloth, or fiber. In the embodiment of the invention illustrated in FIG. 9, fins 502 are positioned perpendicularly to the general flow 512 of the fluid stream. One embodiment of this invention includes fins 502 constructed of porous materials such as paper or cloth through which the fluid can flow. This configuration of the invention provides excellent contact between the photocatalyst and the fluid. However, there is a consequent effect on pressure drop over the reactor as the fluid flow is interrupted by the fins. In this configuration, the pressure drop will be related to the pore size of the fin material. Decreasing the pore size increases the pressure drop but improves transport of the undesired compounds to the photocatalyst. The preferred pore size is less than 1000 microns and most preferably less than 10 microns.

An alternate embodiment, not shown, of this invention is to configure fins 502 and the associated pleats 536 parallel to the general flow direction 512 of the fluid. This provides a reactor with a lower pressure drop than the previously described pleated-fin reactor. However, the transport of compounds to the photocatalyst is reduced.

It will be generally recognized that design considerations for reactor 500 including the choice of light source and photocatalyst, and the inclusion of a blower, pre-filter, post-filter, adsorbent buffer, ozone generator, and sensor as well as the configuration of the embodiment into a modular subassembly are substantially the same as described above for reactor 100.

Figure 11:
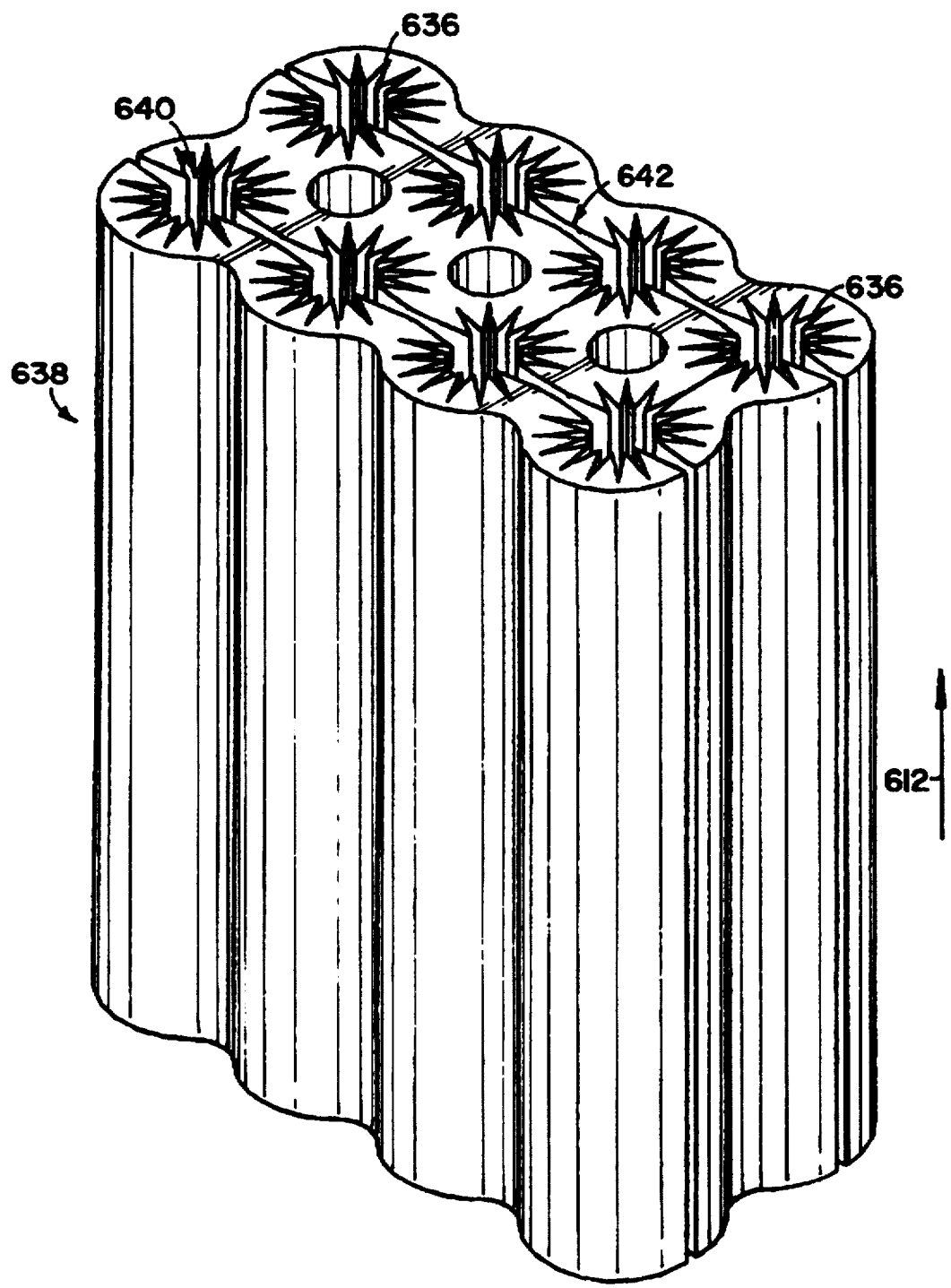
FIG. 11 is a perspective view of a formed block 638 for use as a catalyst support in the invention.

In another embodiment of the invention 600, illustrated in FIG. 11, the support fixture for the photocatalyst is a formed block 638 having one or more cylindrically shaped cavities 640 defined by a surface with one or more pleats 636 in an approximately star-shaped configuration. Formed block 638 may be made of metal, foam, fibers, plastic, or polymers and may be comprised of one or more pieces to permit easy manufacture through processes such as molding. The photocatalyst is deposited on the surface of pleats 636. A longitudinal light source, not shown but substantially similar to light source 104, is provided within cavity 640 with the longitudinal axis of the light source being approximately parallel to the longitudinal axis of cavity 640. The light source preferably extends along the entire length of cavity 640 so as to illuminate the entire surface of pleats 636.

Cavities 640 are aligned parallel to the general flow direction 612 of the fluid stream so that fluid flows along the surface of pleats 636. Optionally, the blocks, including pleats, are formed of a porous material, permitting penetration and flow of fluid through the block. Cavities 640 may be connected by small passages 642 to allow for better manufacturing and maintenance.

It will be generally recognized that design considerations for this reactor including the choice of light and photocatalyst, and the inclusion of a blower, pre-filter, post-filter, adsorbent buffer, ozone generator, and sensor as well as the configuration of the embodiment into a modular subassembly are substantially the same as described above for reactor 100.

A measure of the efficiency for the reactors of this invention is the term $K_{ef}A_n/V$ where $K_{ef}$=the effective surface rate constant which depends on the contaminant, catalyst, illumination, concentration of contaminant, concentration of other species, and mass transfer;

$A_n$=the active catalyst surface area for n reactor stages; and

V=the reactor volume.

For conditions typically found in indoor air purification the following relationship holds:

$$K_{ef}A_n/V = -Q\ln(C_{out}/C_{in})/V$$

where

Q=volumetric flow rate through the reactor and

C=pollutant concentration.

For example, when the fluid is indoor air, an efficient system based on the invention herein described should have a value of $K_{ef}A_n/V$ greater than 25 min$^{-1}$, preferably greater than 75 min$^{-1}$, and most preferably greater than 100 min$^{-1}$ for a target pollutant such as formaldehyde.

For transport and storage, it is important to maintain the reactors in an atmosphere that minimizes fouling and deactivation of the photocatalyst. For example, the photocatalyst is susceptible to damage caused by dust particles, gases, including silicons and nitrogen oxides. To protect the photocatalyst, storing and shipping is preferably in a closed container that does not contain significant levels of silicones, nitrogen oxides, or volatile organic compounds (VOC's), that does not off-gas significant amounts of VOC's, and that does not permit diffuision of VOC's, silicones or nitrogen oxides into the container. Examples of such materials include low permeability polymers, such as Tedlar® (DuPont).

EXAMPLE 1

A reactor of the type illustrated in FIGS. 1–5 was constructed and tested. 148 aluminum fins having the configuration illustrated in FIG. 4 with dimensions 9.62"×10"×0.024" and including protruding turbulent generators were sandblasted to roughen their surface. The fins were spray coated with a 1:1 mixture of titanium dioxide photocatalyst (Bayer Corp., Bayertitan A VP PK 5585) and alumina (Vista Dispal 23N4-20 alumina sol). The fins were arranged parallel to one another and configured so that spacing between the fins was about 0.2". Six germicidal lamps emitting primarily at 254 nm (Phillips TUV 30 W G30T8 UV-C long life) were inserted into the fins. Total power input to each lamp was 30 watts. The photocatalytic portion of the reactor was 9.62" high and 10" wide.

A continuous flow experiment was performed. The flow rate through the system was determined to be 157 ft$^3$/min using a hot wire anemometer. Formalin solution (37% wt. formaldehyde and 12% wt. methanol in water) was introduced as a contaminant into the air by vaporizing a known volume of solution per unit time using a syringe pump and a hot plate located directly beneath the inlet of the reactor. Outlet concentrations from the reactor were measured using a photoacoustic infrared analyzer.

The reactor was initially run with the lights turned off to allow for any concentration changes due to adsorption on the catalyst surface. The steady state concentrations of the contaminants in the dark were 2.37 ppmv formaldehyde and 0.85 ppmv methanol. The lights were turned on and the photocatalytic conversion of the compounds began. Steady state concentrations of the compounds were reached in 20 minutes. The concentration of formaldehyde was 0.83 ppmv yielding a conversion of 65.0%. From these results, the efficiency of the reactor, $K_{\mathit{eff}}A_n/V$, was calculated to be 88 min$^{-1}$ for formaldehyde.

The efficiency of a photocatalytic reactor can be modeled or calculated based on theoretical considerations of three elemental processes: mass transfer of reactants to the catalytic surface; reaction on the catalytic surface, and distribution of photons or irradiance on the surface.

Mass transfer, or the rate of consumption of pollutant by the photocatalytic reactor can be described by the equation:

$$\frac{dC_p}{dA} = -k_m(C_p - C_{ps}) \quad [\text{Eq. I}]$$

where $C_p$ and $C_{ps}$ are the concentrations of pollutant in the bulk fluid phase and on the surface of the catalyst, respectively, and A is the area of the catalytic surface. The mass transfer coefficient, $k_m$, relates the rate that the pollutant is transported from the bulk fluid phase to the surface. It is determined from standard correlations in literature textbooks for either a laminar or turbulent flow.

The rate of consumption of pollutant on the surface of the catalyst is assumed to be well described by a Langmuir-Hinshelwood-type expression for the rate of the reaction, which for the systems modeled here is given as:

$$\frac{dC_{ps}}{dA} = -\frac{k_0 I^{1/2} K_p C_{ps} K_w C_w}{(1 + K_p C_{ps} + K_w C_w + K_m C_m)^2} \quad [\text{Eq. II}]$$

where $C_w$ and $C_m$ are the concentrations of water and methanol, I is the local irradiance, $k_o$ is a rate constant, and the constants $K_p$, $K_w$ and $K_m$ are equilibrium absorption constants.

Other species competing for reactive sites, such as water and other pollutants such as methanol, can be included in the model by modifying the denominators of the equation. Generally, the concentrations of methanol and water are those on the surface; however, since they are consumed at a relatively small rate compared to a pollutant such as formaldehyde, an assumption can be made that the concentrations are approximately equal to the values in the bulk fluid.

To solve the equations (I) and (II), the irradiance on the photocatalytic surfaces is determined. The distribution of photons, or irradiance from the lamps is modeled by assuming that the surfaces of the lamps are comprised of a set of point sources of light, each with an I, which decays as the square of the inverse distance. The irradiance at a point on a catalytic surface of the reactor is the sum of the effects of all the visible sources.

The irradiance is computed using the location and light emitting characteristics of the lamps and the geometric configuration of the catalytic surfaces. Equations I and II are solved simultaneously to determine how the concentration of pollutant varies throughout the reactor, given a set of constants, or the equations are used to fit data from another reactor to determine the constants for use in other designs.

Using these modeling criteria, other configurations of the reactor were modeled, with the results of the modeling for specific design changes shown below in Table 1. The modeling was done using formaldehyde as a model pollutant, and with $k_m$ for laminar flow calculated as 2.5 times the ratio of the diffusivity of the fluid to the hydraulic radius of the structure through which the fluid flows, where the hydraulic radius is the ratio of the cross-sectional area of the structure to the inner perimeter of the structure. Other constants used included $k_0$=79.9; $K_p$=0.868; $K_w$=0.00072; and $K_m$=3.5, where I is measured in mW/cm$^2$. Using these relationships, other configurations of the reactor were subjected to mathematical modeling, with the results as indicated in the Table 1.

The length was determined by the number of plates and the plate spacing. In cases 1, 2, 4, and 5 (as shown in Table 1) the length of the photocatalytic portion of the reactor was 33.4". In case 3, the length was 49.8" due to the increased spacing between the plates.

TABLE 1

| Case No. | No. of Fins | Fin Spacing (inches) | No. of Lamps | Turbulent Flow Generator | Formaldehyde Conversion % |
|---|---|---|---|---|---|
| 1 | 150 | 0.2 | 6 | Yes | 53.5 |
| 2 | 100 | 0.31 | 6 | Yes | 37.1 |
| 3 | 150 | 0.31 | 6 | Yes | 46.8 |
| 4 | 150 | 0.2 | 5 | Yes | 51.8 |
| 5 | 150 | 0.2 | 6 | No | 48.0 |

These modeling results indicate that a greater number of fins, smaller spacing between fins, an increased number of lamps, and inclusion of turbulent flow generators are each factor which improve the efficiency of the inventive reactor.

EXAMPLE 2

A reactor of the type illustrated in FIG. 11 was constructed from a small room air cleaner (Honeywell Enviracaire, Hagarstown, Md., part #11200). The cleaner contained a cylindrical HEPA air filter element (Honeywell Enviracaire, Hagarstown Md., type EV50). A small blower at the center of the filter element pumped air radially inward through the filter and the air was exhausted at the bottom of the cleaner. The cleaner was converted into a photocatalytic air cleaner through the installation of two 8 inch diameter circular fluorescent black lights (Sylvania, Danvers, Mass. FC8T9/350BL/RS) inside a filter cartridge. The filter surface was coated with a photocatalytic film $TiO_2$ (Bayertitan AVPPK5585) by dip coating the filter in a slurry of $TiO_2$ and water.

The feed gas was prepared by vaporizing an aqueous solution of formalin. The solution was pumped by syringe pump into a heated dish. The vapor was drawn into a duct, rapidly mixed by a fan in the duct, and then pumped into the reactor. The volumetric flow was measured using a Davis LCA 6000 vane anemometer which measured the gas velocity from the exhaust duct.

The concentration of formaldehyde was measured by a Bruel and Kjaer type 1302 photoacoustic infrared multi-gas monitor. Results from the experiments are given in Table 2 where "SPR" is the single pass reduction percentage of formaldehyde after one pass through the reactor.

TABLE 2

| Formaldehyde, ppmv | Methanol, ppmv | Q, ft³/min. | SPR, % |
|---|---|---|---|
| 3.72 | 17.0 | 57.5 | 14.8 |
| 3.79 | 4.41 | 55.0 | 24.3 |
| 1.89 | <0.1 | 52.5 | 20.6 |
| 1.79 | <0.1 | 27.7 | 37.5 |

The efficiency of the unit, measured as $K_{ef}A_n/V$, was 13.8 min$^{-1}$ at an input power to the lamps of 44 watts, indicating that the system was not particularly efficient because the photocatalyst-coated filter did not have uniform pleats and shadowing on the filter surface was not minimized.

EXAMPLE 3

A reactor was constructed according to FIG. 9. The reactor comprised one sheet of a photocatalyst-coated pleated support structure irradiated from both sides. The reactor was constructed so that there was no shadowing on the pleated support structure surface. The catalyst comprised Degussa P25 titanium dioxide which was washcoated on cheesecloth support structure using a 20% solution in ethanol. The feed gas was formaldehyde with 9,300±300 ppm water. The flow rate was 300±20 ft³/min. The 365 nm black light lamps and pleats were oriented so as to avoid shadowing.

The system was allowed to equilibrate with the lamps turned off until outlet and inlet concentrations were within 5%. The system was then allowed to run for an additional hour with the lamps turned on to establish a steady-state. The reactant concentration at the outlet was then tracked for 30 minutes. The amount of reactant oxidized proved to be limited by reactant transfer to the photocatalyst. Results are presented in Table 3.

TABLE 3

| Pleat Spacing, in. | Pleat Depth, in. | ppmv in | ppmv out | % Conversion |
|---|---|---|---|---|
| 1.5 | 5 | 3.6 | 2.8 | 22.2 |
| 0.5 | 5 | 3.6 | 2.5 | 30.6 |
| 1.5 | 10 | 3.8 | 2.8 | 26.3 |
| 0.5 | 10 | 4.1 | 2.5 | 39.0 |

These results are all within 5% of those predicted by computer modeling. As a reference point, an unpleated layer of the cheesecloth with photocatalyst is predicted to give 8% conversion. The system was completely mass transfer limited. Higher conversion percentages are expected upon reducing the pore diameter, for example, to 0.5 mm, thereby improving mass transfer.

The efficiency of this unit, measured as $K_{ef}A_n/V$, was 68.8 min$^{-1}$ at an input power of 160 watts. This result indicates that the reactor was efficient. After normalizing the results of this Example and those in Example 2 to account for differences in the irradiation intensity, using 100 watts of input power as a basis, $K_{ef}A_n/V$ was 20.8 min$^{-1}$ for the reactor of Example 2 and 54.4 min$^{-1}$ for the reactor in this Example. The difference in the efficiencies between the two reactors is due, at least in part, to the careful construction of the pleated surface to avoid shadowing in the reactor of this Example.

EXAMPLE 4

A theoretical reactor was modeled having a structure similar to the reactor shown in FIG. 6 with a lamp disposed in the central core rather than as an annular ring configured within the fins. Fins were regularly spaced around the lamp and radiating outward. The lamp had a diameter of 25 mm. The circumference of the lamp was 79 mm and 40 fins were inserted around the lamp giving a spacing between the fins of approximately 2 mm near the lamp surface. This configuration provided a reactor with a large photocatalytically active surface relative to a plain cylinder coated with photocatalyst enabling increased photocatalytic conversion of contaminants relative to the plain cylinder with little penalty in pressure drop across the structure.

EXAMPLE 5

A reactor of the type depicted in FIGS. 6 and 7 was modeled. The model Included the use of two 20 W lamps per stage of the reactor with fins containing titanium dioxide. Rate constants for the photocatalytic conversion of contaminants by titanium dioxide were calculated from experimental measurements. The model is based on a feed of indoor air containing 2 ppm formaldehyde and 4 ppm methanol. Predicted conversion rates are shown in Table 4.

TABLE 4

| No. of Fins | Fin Height, cm | Reactor Radius, cm | No. of Stages | Formaldehyde Conversion, % |
|---|---|---|---|---|
| 108 | 5.0 | 23 | 5 | 30.1 |
| 144 | 5.0 | 23 | 5 | 38.0 |
| 168 | 5.0 | 23 | 5 | 42.6 |
| 216 | 5.0 | 23 | 5 | 50.9 |
| 108 | 7.5 | 23 | 5 | 35.3 |
| 108 | 10.0 | 23 | 5 | 39.1 |
| 108 | 15.0 | 23 | 5 | 44.7 |
| 108 | 5.0 | 30 | 5 | 32.5 |
| 108 | 5.0 | 40 | 5 | 34.4 |

TABLE 4-continued

| No. of Fins | Fin Height, cm | Reactor Radius, cm | No. of Stages | Formaldehyde Conversion, % |
|---|---|---|---|---|
| 108 | 5.0 | 23 | 7 | 37.4 |
| 108 | 5.0 | 23 | 8 | 41.6 |
| 108 | 5.0 | 23 | 9 | 43.6 |
| 108 | 7.5 | 23 | 8 | 47.2 |
| 108 | 7.5 | 23 | 9 | 50.4 |
| 108 | 10.0 | 23 | 9 | 55.3 |
| 168 | 7.5 | 23 | 7 | 58.8 |
| 108 | 7.5 | 23 | 7 | 43.6 |
| 168 | 5.0 | 23 | 7 | 52.1 |

The predicted efficiency of this unit based on a theoretical model, as measured by $K_{ef}A_r/V$, is on the order of 100 min$^{-1}$ for those units in Table 4 which have conversion percentages of over 50%. This value of $K_{ef}A_r/V$ indicates that the reactor is efficient.

The invention described herein was made with the financial support of the National Institute of Standards and Technology under the Advanced Technology Program, contract number 70NANB5H1125.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A reactor for use in the photocatalyzed conversion of contaminants in a fluid stream having a general flow direction, the reactor comprising:

a light source;

a photocatalyst; and a plurality of non-intersecting fins for placement within the fluid stream to provide support for the photocatalyst, the fins being oriented substantially parallel to the general flow direction of the fluid stream and substantially orthogonal to the light source, the fins being configured so that the light source illuminates the photocatalyst with light having a wavelength capable of activating the photocatalyst.

2. The reactor of claim 1, wherein each fin is a thin, flat sheet.

3. The reactor of claim 1, wherein each fin has one or more openings through which the light source penetrates.

4. The reactor of claim 1, wherein the light source is comprised of one or more lamps.

5. The reactor of claim 4, wherein the one or more lamps are cylindrical.

6. The reactor of claim 4, wherein the one or more lamps are curved.

7. The reactor of claim 1, wherein the fins are radially disposed around the light source.

8. A reactor for use in the photocatalyzed conversion of contaminants in a fluid stream having a general flow direction, the reactor comprising:

a plurality of non-intersecting fins for placement within the fluid stream, the fins being positioned approximately parallel to the flow direction of the fluid stream and radiating approximately orthogonally from a central core, the central core having an outer circumference, the fins being approximately evenly spaced around the outer circumference of the central core;

a photocatalyst disposed on the fins; and a light source comprising one or more annular lamps disposed approximately concentrically around the central core, the lamps penetrating the fins and configured so that the light source illuminates the photocatalyst with light having a wavelength capable of activating the photocatalyst.

9. A reactor for use in the photocatalyzed conversion of compounds in a fluid stream having a general flow direction, the reactor comprising:

a light source comprising one or more lamps;

a photocatalyst;

one or more fins for placement within the fluid stream to support the photocatalyst, each fin comprising one or more pleats, the pleats aligned substantially parallel to the direction of the fluid stream, the lamps and fins configured to minimize shadowing in the pleats and illuminate the photocatalyst with an activating amount of light.

10. The reactor of claim 9, wherein the fins are porous.

11. A reactor for use in the photocatalyzed conversion of contaminants in a fluid stream having a general flow direction, the reactor comprising:

one or more fins for placement within the fluid stream, each fin comprising one or more pleats for contact with the fluid stream, each fin further comprising a porous material through which the fluid stream can flow, a photocatalyst disposed on the fins; and a light source comprising one or more longitudinal lamps wherein each lamp has a longitudinal axis, at least one of the lamps being oriented with respect to each fin so that the longitudinal axis of the oriented lamp is perpendicular to the pleats of the fin to provide light to illuminate the photocatalyst.

12. A reactor for use in the photocatalyzed conversion of compounds in a fluid stream having a general flow direction, the reactor comprising:

two or more cylinders disposed in a formed block and oriented to allow passage of the fluid stream flowing in the general flow direction through each cylinder, each cylinder comprising an inner surface and a longitudinal axis, the inner surface of each cylinder having one or more pleats running substantially parallel to the longitudinal axis of the cylinder;

a photocatalyst disposed on the inner surface of each cylinder; and a light source positioned longitudinally within each cylinder to illuminate the photocatalyst with light having a wavelength capable of activating the photocatalyst.

13. The reactor of claim 12, wherein said two or more cylinders are connected together in the formed block.

14. The reactor of claim 13, wherein said formed block and said pleats are formed of a porous material permitting fluid flow throughout.

15. A reactor for use in the photocatalyzed conversion of compounds in a fluid stream having a general flow direction, the reactor comprising:

a plurality of annular fins stacked in a spaced-apart manner to form a column having a central cavity, the central cavity being oriented to receive the fluid stream flowing in the general flow direction;

a rotation device coupled to the column of fins for rotating the fins to produce a centrifugal force on the fluid stream resulting in fluid flow between the spaced-apart fins;

a photocatalyst disposed on the plurality of fins; and a light source in optical proximity and substantially orthogonal to the fins to illuminate the photocatalyst with light having a wavelength capable of activating the photocatalyst.

16. The reactor of claim 1, wherein the photocatalyst is $TiO_2$, $ZnO$, $CaTiO_3$, $SnO_2$, $MoO_3$, $Fe_2O_3$, $WO_3$, $Nb_2O_5$, SiC or $Ti_x(Zr_{1-x})O_2$ where x has a value between 0 and 1.

17. The reactor of claim 1, wherein the reactor further comprises one or more additional structures positioned to receive the fluid stream, the one or more additional structures being a pre-filter, a post-filter, an adsorbent buffer, an ozone generator, or a combination thereof.

18. The reactor of claim 1, wherein the fins are comprised of metal, plastic, polymers, paper, cloth, or fiber.

19. The reactor of claim 1, wherein the fins comprise a light scattering or reflective surface.

20. A modular reactor assembly comprising one or more reactors of claim 1 adapted for interconnection in series or in parallel.

* * * * *

UNITED STATES PATENT AND TRADEMARK OFFICE
CERTIFICATE OF CORRECTION

PATENT NO.   : 5,790,934
DATED        : August 4, 1998
INVENTOR(S)  : Say et al.

It is certified that error appears in the above-identified patent and that said Letters Patent is hereby corrected as shown below:

Column 4,
Line 26, "I,," should read -- $I_0$. --

Column 5,
Lines 12-13, no new paragraph after "0.25 cm–0.75 cm."

Column 8,
Line 48, "1 16" should read -- 116 --

Column 12,
Line 23, "I," should read -- $I_0$ --

Signed and Sealed this

Second Day of July, 2002

Attest:

Attesting Officer

JAMES E. ROGAN
Director of the United States Patent and Trademark Office